Dec. 26, 1933.  H. J. KERR ET AL  1,940,805
SUPERHEATER FOR WATER TUBE BOILERS
Filed Nov. 10, 1928  3 Sheets-Sheet 1

INVENTORS
Howard J. Kerr
William H. Jones
BY
Gifford & Scull
ATTORNEYS

Dec. 26, 1933.　　　H. J. KERR ET AL　　　1,940,805
SUPERHEATER FOR WATER TUBE BOILERS
Filed Nov. 10, 1928　　　3 Sheets-Sheet 2
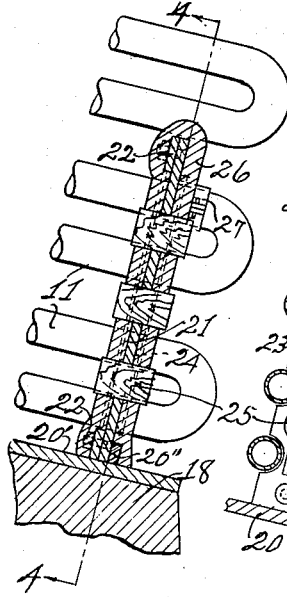
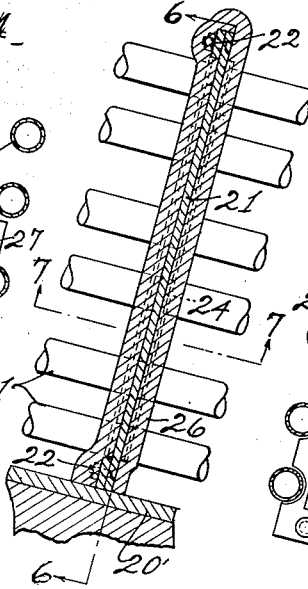
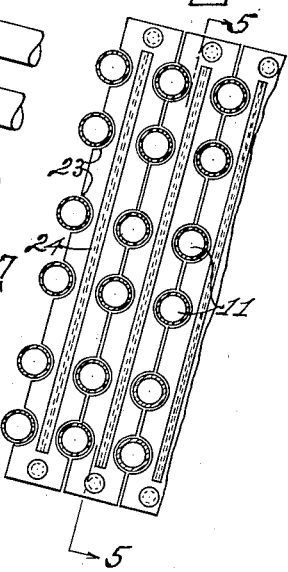
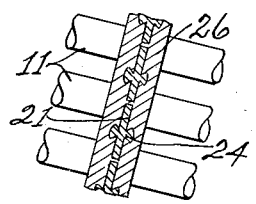
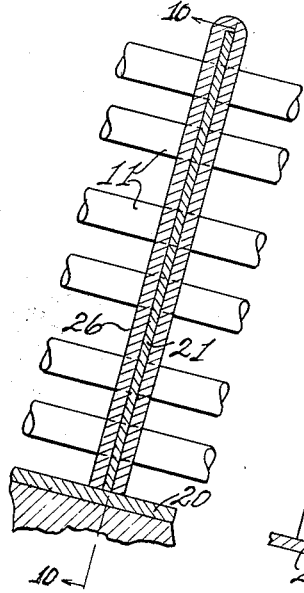
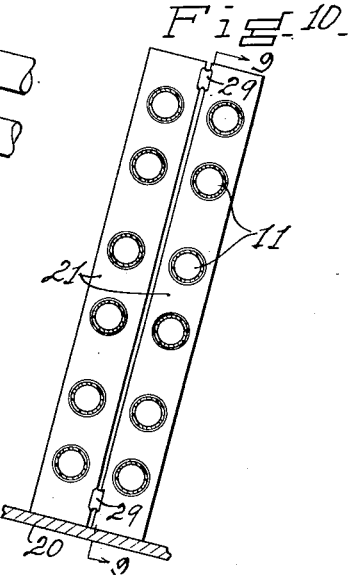
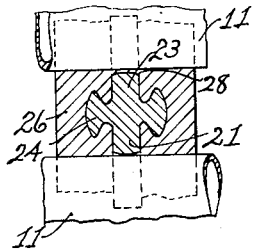
INVENTORS
Howard J. Kerr
William A. Jones
BY
Gifford + Sewell
ATTORNEYS Dec. 26, 1933.   H. J. KERR ET AL   1,940,805
SUPERHEATER FOR WATER TUBE BOILERS
Filed Nov. 10, 1928   3 Sheets-Sheet 3
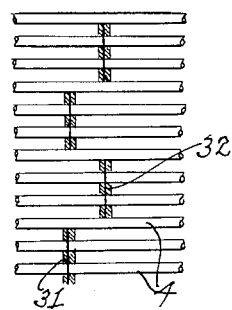
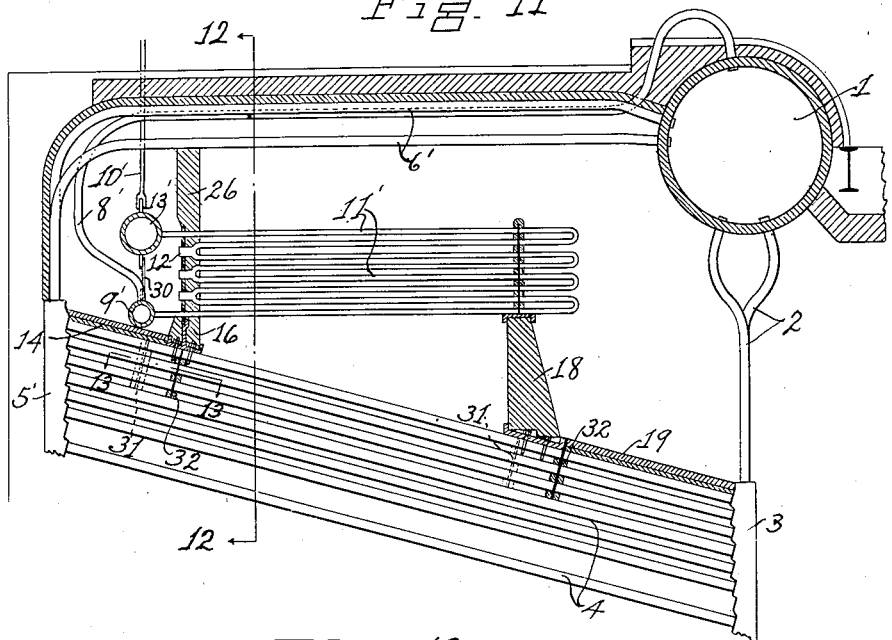
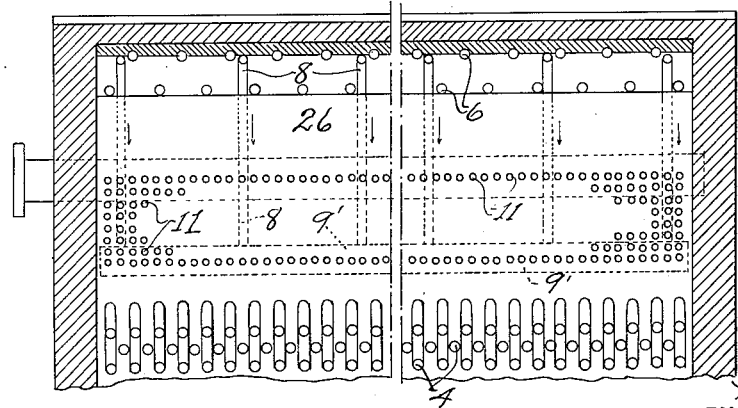
INVENTORS
Howard J. Kerr
William A. Jones
BY
Gifford & Scull
ATTORNEYS Patented Dec. 26, 1933

1,940,805

UNITED STATES PATENT OFFICE 1,940,805

SUPERHEATER FOR WATER TUBE BOILERS

Howard J. Kerr, Westfield, N. J., and William A. Jones, Westerleigh, N. Y., assignor to The Babcock & Wilcox Company, Bayonne, N. J., a corporation of New Jersey Application November 10, 1928
Serial No. 318,352

10 Claims. (Cl. 122—478)

This invention relates to a superheater located above the bank of inclined tubes of a water tube boiler. The superheater comprises U-tubes and inlet and outlet headers, the headers being protected from direct contact by the gases that pass over the superheater tubes.

Figure 1:
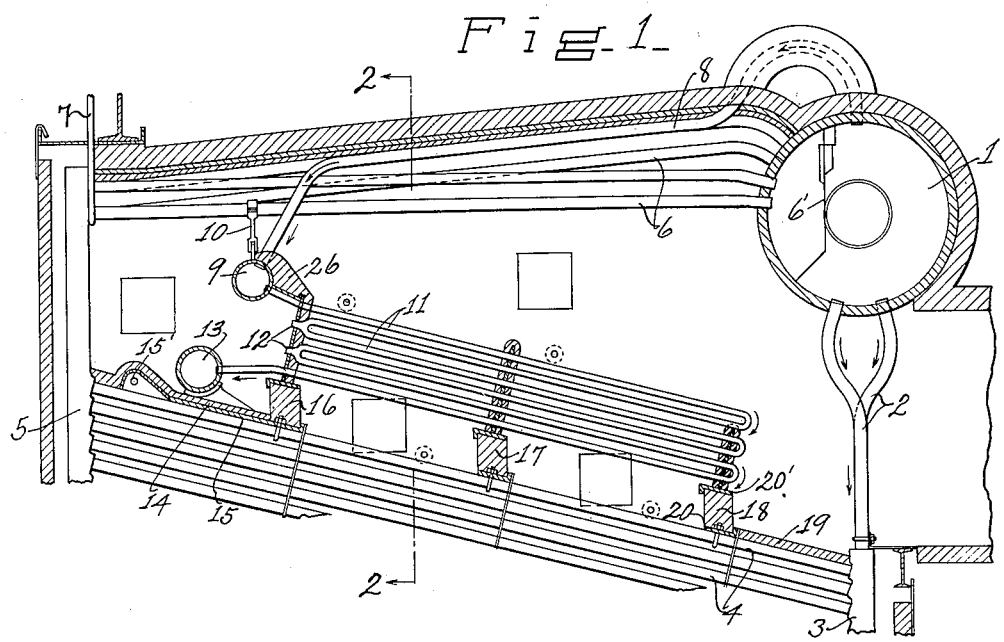
Figure 2:
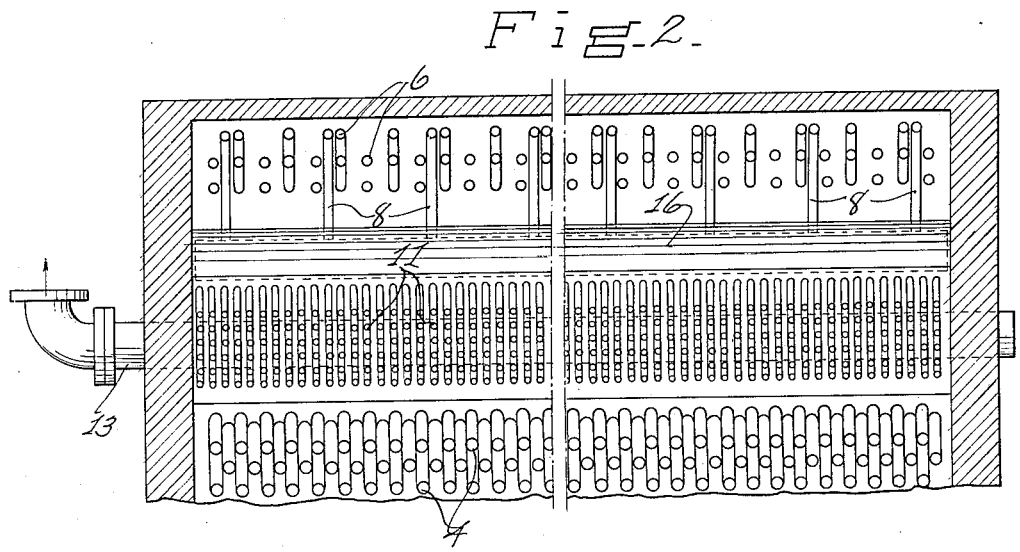

The invention will be understood from the description in connection with the accompanying drawings in which Fig. 1 is a vertical section of an illustrative embodiment of the invention; Fig. 2 is a section along the line 2—2 of Fig. 1; Fig. 3 is a vertical section partly broken away on an enlarged scale taken along the line 3—3 of Fig. 4 showing a support for the superheater tubes; Fig. 4 is a section along the line 4—4 of Fig. 3; Fig. 5 is a section similar to Fig. 3 taken along the line 5—5 of Fig. 6, showing another support; Fig. 6 is a section taken along the line 6—6 of Fig. 5; Fig. 7 is a section along the line 7—7 of Fig. 5; Fig. 8 is a section similar to Fig. 7 on an enlarged scale; Fig. 9 is a section similar to Fig. 5 taken along the line 9—9 of Fig. 10 showing a modification; Fig. 10 is a section along the line 10—10 of Fig. 9; Fig. 11 is a vertical section similar to Fig. 1 showing a modification; Fig. 12 is a section along the line 12—12 of Fig. 11; and Fig. 13 is a section along the line 13—13 of Fig. 11.

In the drawings, reference character 1 indicates the steam and water drum of a water tube boiler having downtake nipples 2 connecting the water space of the steam and water drum to the downtake headers 3. An inclined bank of tubes 4 extends from the downtake headers 3 to the uptake headers 5, the ends of which are extended and have their sides connected by means of horizontally extending circulating tubes 6 to the steam space of the steam and water drum 1. A baffle of the shutter type as illustrated in application Ser. No. 301,456 or any other convenient and suitable baffle 6' may be used in the steam and water drum 1 to separate the steam and water entering from the circulating tubes 6. Supporting straps 7 extend from supports outside of the boiler casing around tubes in the lowermost row of tubes 6 near their connections with the headers 5.

A plurality of pipes 8, preferably equally spaced along the steam and water drum 1, extends from the steam space of the steam and water drum 1 to the superheater inlet header 9 of the superheater that is located between the bank of tubes 4 and the tubes 6, the pipes 8 preferably being located as high as possible in the setting and passing between the tubes 6 and being above the lowermost tubes 6 so as to be protected from excessive heat. They may be substantially parallel to the tubes 6 for a portion of their lengths. By providing a plurality of distributed saturated steam supply tubes 8 from the steam and water drum 1 to the superheater header 9 a more uniform distribution of steam to the tubes 11 and a much smaller inlet header 9 can be used than would otherwise be required. The header 9 is supported from the tubes 6 by means of straps 10. A row of U-tubes 11 for the superheater extends from the header 9 parallel to the tubes 4 and each one has the leg that is connected to the header 9 longer than the other one. The ends of short legs of the U-tubes 11 are connected to the ends of other U-tubes by Y connectors 12. The shanks of the connectors 12 pass through holes in a support so that the ends of U-tubes 11 are thereby supported. The lowermost row of U-tubes 11 has one leg longer than the others to extend and be connected to the superheater outlet header 13 that is supported upon saddles 14 on the bank of tubes 4. The ends of the tubes 11 extend a sufficient distance beyond the return bends 12 to give the tube ends that enter the header 13 a chance to cool off or become considerably cooler than the portions of the tubes 11 over which the hot gases pass. This length also gives the header 13 a chance to expand without destroying the connection of the tubes to the header. A baffle 15 extends under the header 13 from the headers 5 along the upper side of the bank of tubes 4 to a support 16 located under one end of the superheater tubes. The baffle 15 comprises a metal plate which is carried upward to accommodate a soot blower 15'. The baffle 15 is prevented from sliding downwardly by a tube clamp or U-bolts at its lower edge extending around tubes 4, and may also comprise a layer of refractory material on the metal plate. Another support 17 resting upon the bank of tubes 4 extends across an intermediate portion of the superheater tubes 11 and a third support 18 is provided at the other or bent end of the superheater tubes. A baffle 19 extends along the upper side of the bank of tubes 4 from the support 18 to the headers 3. The gas has a single pass across the tubes 4 and then passes through the space between the edges of the baffles 14 and 19 across the superheater tubes 11 and thence out between the nipples 2 to the stack.

The support for the bent ends of the superheater tubes 11 is shown in detail in Figs. 1, 3 and 4. A metal plate 20 is laid across the uppermost row of tubes 4 at the end of the baffle 19 and refractory material may be interposed between this plate and a similar plate 20' that is flat on top. The support proper for the bent end of the tubes 11 rests upon the plate 20'. The support may be made up of a number of vertically disposed metal strips 21 having their lower ends resting upon the upper plate 20'. The upper and lower ends of the strips 21 may be attached to cross straps 22 by means of bolts or the like, and a stop 20'' may be attached to the top side of the plate 20' to prevent the lower ends of the strips 21 from drifting downwardly.

The metal strips 21 are preferably made as wide as the distance between tube centers in horizontal rows of tubes 11 and are provided along their edges with semi-circular notches 23 to accommodate the tubes. The sides of the strips 21 are provided with bulbed ribs 24 to retain plastic refractory material that is applied thereto. The strips 21 are also provided with holes in which wood plugs 25 are placed, which plugs will be burned out and leave openings for gases to pass through the support, during operation. The plastic material 26 may be a cement that can be applied to the sides of the strips 21 on the bulbed ribs 24 after the supports are in place. One or more split collars or clamps 27 may be clamped to some of the tubes 11 near the upper ends of the strips 21 to prevent the strips from moving downwardly.

The support for the intermediate portion of the tubes 11, shown in Figs. 5 to 8, is similar to that already described but is shown as extending beyond the uppermost row of tubes 11 with the cross strap 22 above the uppermost row of tubes. The strips 21 have the edges of the semi-circular notches 23 rounded, as most clearly shown at 28 in Fig. 8, so that the strips 21 can be inserted edgewise and turned into place between the tubes 11.

In the modification shown in Figs. 9 and 10, the cross straps 22 are dispensed with and the edges of the strips 21 are welded together as indicated at 29 after the strips have been put in place. Also in this modification the tubes 11 are shown as passing through holes along central lines of the strips instead of through semi-circular notches along the edges of the strips.

In the modification shown in Figs. 11 to 13, the circulating tubes 6' connect the ends of the headers 5' to the steam and water drum 1, the circulating tubes 6' extending upwardly some distance above the headers 5' and then curving into a horizontal plane. In this modification the pipes 8' extend from the steam space of the steam and water drum 1 to the inlet header 9', which is located below the outlet header 13' and is supported therefrom by means of the straps 30. The outlet header 13' is in turn supported by straps 10' from a support (not shown) located outside of the boiler setting.

A plurality of rows of tubes 4 may be utilized for sustaining the weight of the supports for the superheater, as shown in this modification. For this purpose narrow plate sections 31 and 32 are shown extending downwardly a sufficient distance to cause the weight to be supported upon four rows of tubes 4. These plate sections distribute the load on the tubes and are staggered, as most clearly indicated in Fig. 13, so that gases will not be pocketed in the spaces below the baffles 14 and 19. In this modification the superheater tubes 11' are made horizontal so that the superheater can be drained.

The support 16 at the ends of the tubes where the Y-connections 12 are located is provided with a metal plate with holes therein through which holes the shanks of the connections 12 pass for supporting the ends of the tubes. The superheater headers are located in a compartment that is shut off from the direct action of the hot gases. This compartment lies above the baffle 14 and behind the support 16, the support 16 constituting a baffle which extends upwardly above the level of the uppermost superheater header. In the modification shown in Fig. 11 the superheater tubes that are in contact with the hottest gases are the tubes into which the saturated steam enters. The saturated steam tubes from the boiler drum are preferably connected to the top side of the superheater inlet header and the superheater tubes are connected thereto at an angle of 90°, so that the same hand-hole openings can be used for expanding the superheater tubes with a straight mandrel and for expanding the other tubes into the header with a mitre gear drive for the expander. Also by having a plurality of tubes from the boiler drum to the inlet header of the superheater, the header can be made of small diameter and still obtain satisfactory distribution of steam into the superheater tubes.

The superheater headers 9 and 13 or 9' and 13' are located in a pocket of dead gas near the uptake headers 5 where they are considerably cooler than they would be if they were near the downtake nipples 2.

In a superheater of the character described above a single row of superheater tubes is connected to each header, which in itself makes a better arrangement than connecting a multiplicity of rows of superheater tubes to each header, in that no ferrules, cores or distributing baffles are necessary to assure proper distribution of steam to all of the tubes. The passage of steam through single rows of tubes from inlet to outlet header gives a velocity of steam through those tubes such that the tubes themselves are kept fairly close to the temperature of the steam within; in other words, the whole design of superheater is such that whatever allowable pressure drop exists can be built up in the tubes themselves to give this protection, eliminating the drop due to the use of ferrules, cores or distributing baffles.

The steam to be superheated is conducted to the inlet header of the superheater by means of a number of tubes spaced along the length of the inlet superheater header and also spaced along the length of the steam and water drum. Spacing the tubes along the length of the superheater header improves the distribution of the steam between the superheater tubes and allows an inlet header of a smaller diameter to be used than should the steam be made to enter one or both ends of the inlet header, and spacing the tubes along the length of the steam and water drum eliminates the necessity of either a dry box or a dry pipe within the steam drum of the boiler. Spacing the tubes along the length of the steam and water drum is in itself an important factor as the useful effect in preventing moisture from passing from the steam and water drum along with the steam to the superheater makes it possible to use a smaller steam and water drum than would be needed in the ordinary arrangement. A further improvement in the distribution of the steam through the superheater is obtained by making the outlet header of a large diameter.

The higher the velocity of steam through the tubes the lower will be the temperature of the metal in the tubes and the steam can be superheated to the higher temperatures without danger of burning the tubes with a high velocity of steam through the tubes than with a low velocity. The steam may enter the superheater inlet headers so located, as illustrated for example in Fig. 11 so that the cool or saturated steam will enter the row of superheater tubes that is subjected to the greatest amount of heat or are contacted by the hottest gases.

We claim:

1. In a water tube boiler having a bank of inclined tubes, a superheater, supports extending from said bank of tubes to said superheater, said supports being in turn supported by a plurality of rows of tubes of said bank of tubes through sections spaced apart among said rows of tubes.

2. A single gas pass cross drum boiler of the Babcock & Wilcox type comprising a steam offtake drum, a bank of steam generating tubes, a furnace, means for directing the furnace gases in a single gas pass across the generating tubes and then out of the boiler adjacent the drum, means for restricting the gas pass at both sides above the tubes, a superheater having its tubes extending across the restricted portion of the gas pass, superheater headers located near the ends of the tubes opposite the drum, and a baffle construction co-operating with a part of the restricting means to provide a dead gas pocket in which the superheater headers are located.

3. A superheater tube spacer comprising, in combination, a plurality of metal strips with arcuate tube receiving notches along their margins, combustible plugs extending through the strips, plastic refractory anchoring means on the strips, and a refractory covering placed on the strips and around the plugs while in a plastic condition.

4. In a water tube steam boiler, a bank of inclined steam generating tubes arranged in a plurality of rows, a superheater above the bank, a compression pier maintaining one end of the superheater, and a plurality of spaced supports arranged transversely of the tubes in a plurality of rows and transmitting the pier load to the tubes of a plurality of different horizontal rows.

5. A boiler comprising a steam offtake drum, a bank of steam generating tubes, uptake and downtake headers connected at opposite ends of the tubes, a furnace, means for directing the furnace gases in a gas pass across the generating tubes and then out of the boiler at a position adjacent the drum, baffles and superheater supports for restricting the gas pass at both sides above the tubes, circulators connecting the uptake header with the drum, a superheater positioned above the tubes and adjacent the circulators and having its tubes extending across the restricted portion of the gas pass, a superheater header located near the ends of the tubes opposite the drum, and a baffle construction located at the side of the gas pass adjacent the superheater header and co-operating with a part of the restricting means at said side and with said circulators to provide a dead gas pocket in which the superheater header is located.

6. In a water tube steam boiler, a bank of inclined steam generating tubes aranged in a plurality of rows, a superheater above the bank, a compression pier maintaining one end of the superheater, and a plurality of spaced supports arranged transversely of the tubes and transmitting the pier load to the tubes of a plurality of different horizontal rows, there being gas passages between adjacent supports.

7. In a water tube steam boiler, a bank of inclined steam generating tubes extending across a gas pass, a steam offtake drum at one side of the gas pass, a baffle extending across the generating tubes at the end opposite the drum, means whereby all of the furnace gases move from the top of the gas pass toward one side thereof and out of the boiler, a superheater extending across the gas pass beyond the generating tubes, circulatory connections discharging steam and water from the tubes into the drum, a gas pass wall spaced inwardly of the connections above the tubes to cooperate with the baffle to form a dead gas pocket at the side of the gas pass opposite the side toward which the gases move, a superheater header located in said pocket, a boiler wall outside of the connections for confining furnace gases, and a row of small steam offtake tubes leading from the top of the drum and thence between and along said connections to the superheater header.

8. In a water tube steam boiler, a bank of steam generating tubes, uptake and downtake headers connected at opposite ends of said tubes, a steam and water drum positioned above the downtake header and connected thereto, circulators connecting the uptake header with the drum, a superheater positioned above the tubes near the circulators and comprising a plurality of flat coils each having a plurality of return bend tubes constituting superheater sections, a superheater header located adjacent the uptake header and above the tubes, a baffle extending inwardly from the uptake header and across the tubes below the superheater header, a wall extending above the baffle inwardly of the superheater header and cooperating with said baffle, said uptake header and said circulators, to enclose the superheater header in a dead gas pocket out of contact with the furnace gases, and tube sections extending through the pocket from the wall to the superheater header and joining said header to the superheater coil.

9. In a water tube steam boiler, a circulatory system including a bank of steam generating tubes, uptake and downtake headers connected at opposite ends of said tubes, a baffle extending inwardly from the uptake header and across the tubes at the uptake header ends thereof, a wall extending upwardly from the inner end of the baffle to form with said baffle a dead gas pocket adjacent the uptake header and forming a part of a high temperature gas pass extending across the tubes, a superheater within the gas pass and succeeding the generating tubes relative to heating gas flow, said superheater being composed of flat coils of return bend tubes, supports for the coils, inlet and outlet tubes for the coils extending from the return bend tubes through and beyond the wall into the dead gas pocket, a superheater inlet header, a superheater outlet header communicating with the outlet tubes and supported within the dead gas pocket independently of the supports for the coils and in a position spaced a substantial distance from the wall, a steam and water drum above the downtake header, a row of spaced circulating connections discharging steam and water from the uptake header to the steam and water drum, and a row of saturated steam supply tubes having inlets distributed along the steam space of the drum and extending between the spaced circulating connections to positions distributed throughout the length of the inlet header of the superheater.

10. In a water tube steam boiler, a circulatory system including a bank of steam generating tubes, uptake and downtake headers connected at opposite ends of said tubes, a steam and water drum positioned above the downtake header and connected thereto, circulators connecting the uptake header with the drum, and inwardly directed baffle extending across the upper portions of the tubes, a wall extending across the tubes at the inner edge of said baffle and forming a part of a high temperature gas pass extending across the tubes, said baffle, wall and circulators cooperating to form a dead gas pocket adjacent the front ends of the tubes, a superheater positioned above the tubes and near the circulators, said superheater being composed of flat coils each having a plurality of return bend tubes, a superheater inlet header within the gas pocket, an outlet header supported above the tubes and within the dead gas pocket in a position spaced a substantial distance from the wall, inlet and outlet tubes for the coils extending from the return bend tubes through and beyond the wall into the dead gas pocket to the inlet and outlet headers respectively, means for pendently supporting the superheater inlet header within the dead gas pocket out of contact with the baffle and in a region where it is substantially enveloped by furnace gases, and means connected to the boiler for supplying saturated steam to the inlet header of the superheater.

HOWARD J. KERR.
WILLIAM A. JONES.